United States Patent [19]

Salman

[11] Patent Number: 4,828,334
[45] Date of Patent: May 9, 1989

[54] ANTILOCK BRAKE CONTROL SYSTEM

[75] Inventor: Mutasim A. Salman, Rochester, Mich.

[73] Assignee: General Motors Corporation, Detroit, Mich.

[21] Appl. No.: 239,906

[22] Filed: Sep. 2, 1988

[51] Int. Cl.$^4$ ............................................. B60T 8/58
[52] U.S. Cl. .................................. 303/100; 303/111; 303/112; 364/426.02
[58] Field of Search ....................... 303/95, 97, 98, 99, 303/100, 103, 106, 110, 111, 112, DIG. 4; 364/426

[56] References Cited

U.S. PATENT DOCUMENTS

| | | | |
|---|---|---|---|
| 4,653,816 | 3/1987 | Lin | 303/106 |
| 4,664,453 | 10/1985 | Kade et al. | 303/100 |
| 4,750,124 | 6/1988 | Lin et al. | 303/100 X |
| 4,755,946 | 7/1988 | Lin | 364/426 |

Primary Examiner—Duane A. Reger
Attorney, Agent, or Firm—Howard N. Conkey

[57] ABSTRACT

A wheel lock control system in which when an incipient wheel lockup condition is first sensed, the brake pressure at that time is used to estimate a brake pressure value that is substantially equal to but greater than the brake pressure required to produce an incipient wheel lockup condition. The brake pressure is then dumped to allow wheel speed recovery. Following wheel speed recovery, the estimated brake pressure is applied to the wheel brake. At the same time, the brake torque tending to accelerate the wheel is computed by an expression taking into consideration the rate of change in wheel speed as the brake pressure is reapplied. When a peak brake torque value is identified, the optimum brake pressure that will result in the identified peak brake force is determined from the same expression used to calculate the brake torque but with the term associated with the rate of change in wheel speed being eliminated. The pressure to the wheel brake is then established to produce the optimum brake pressure and the wheel-to-vehicle speed ratio that existed at the time the peak brake torque was identified.

4 Claims, 7 Drawing Sheets

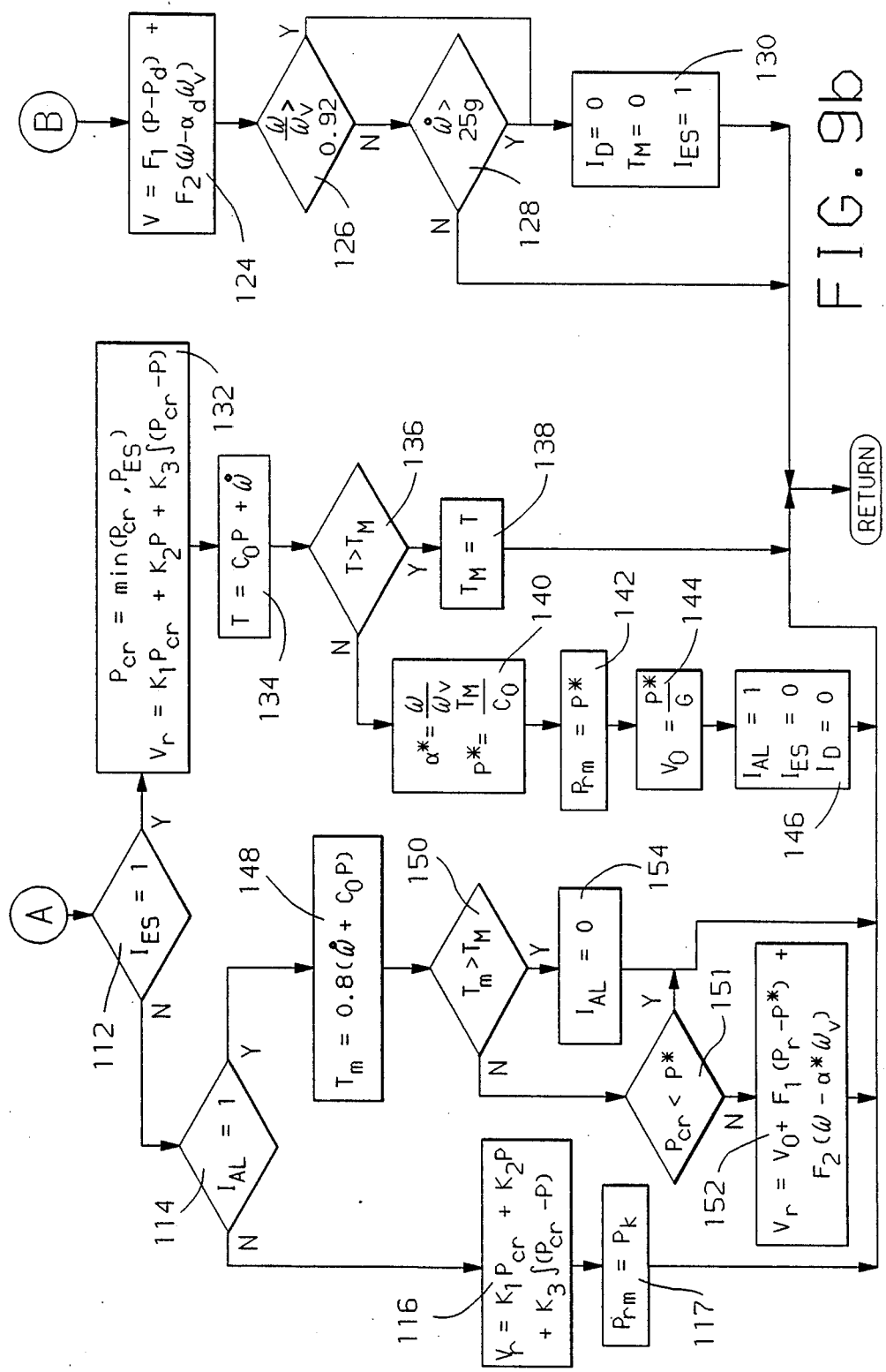

ANTILOCK BRAKE CONTROL SYSTEM

BACKGROUND OF THE INVENTION

This invention relates to an anti-lock control system for vehicle wheel.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reducing vehicle stopping distance and deterioration in the lateral stability of the vehicle.

U.S. Pat. No. 4,664,453 issued on May 12, 1987 and assigned to the assignee of this invention describes a wheel lock control system for preventing the wheels of a vehicle from locking up while being braked. In this system, the wheel brake pressure that results in the wheel slip being substantially at the critical slip value and which produces substantially the maximum braking force between the tire and the road surface is identified. When an incipient wheel lockup condition is detected, the brake pressure so identified is then applied to the wheel brake so as to substantially continuously establish the critical slip value between the wheel and the road surface resulting in the maximum possible braking effort.

The brake pressure producing the critical slip value and therefore the maximum braking force for a vehicle wheel is identified in the above system by repeatedly calculating the tire torque tending to accelerate the wheel during braking based on an equation defining the motion of a free body consisting of the wheel, tire and the brake. This equation utilizes measured values and system constants that are based on, for example, brake lining coefficient of friction and area and wheel radius. The measured brake pressure corresponding in time to the peak calculated tire torque is stored. When an incipient wheel lockup is detected indicating that the critical wheel slip value establishing the peak braking force between the wheel and road surface has been exceeded, the stored brake pressure is the pressure producing substantially the peak braking force. After detection of an incipient wheel lockup condition, the process of identifying the brake pressure producing the peak braking force is ended and the brake pressure is dumped to allow the wheel to recover from the incipient wheel lockup condition. When recovery is sensed, the stored brake pressure producing substantially the peak braking force is reestablished to establish a braking condition in which the wheel slip is substantially at the critical slip value for the existing road-tire interface condition.

SUMMARY OF THE INVENTION

The subject invention is directed toward the form of wheel lock control system as described in the aforementioned U.S. Pat. No. 4,664,453. In accord with this invention, when an incipient wheel lockup condition is first sensed, the brake pressure at that time is used to estimate a brake pressure value that is substantially equal to but greater than the brake pressure required to produce an incipient wheel lockup condition. The brake pressure is then dumped to allow wheel speed recovery. Following wheel speed recovery, the estimated brake pressure is applied to the wheel brake. At the same time, the brake torque tending to accelerate the wheel is computed by an expression taking into consideration the rate of change in wheel speed as the brake pressure is reapplied.

When a peak brake torque value is identified, the slip between the tire and road surface is at the critical value at which a maximum braking effort is produced. Since the rate of change in wheel speed may be significant when the peak determined brake torque was determined, the brake pressure corresponding in time to the peak determined brake torque may not correspond to the pressure producing the peak brake torque at steady state conditions since the rate of change in wheel speed is small and therefore negligible at this condition. Therefore, in accord with this invention, the optimum brake pressure that will result in the identified peak brake force is determined from the same expression used to calculate the brake torque but with the term associated with the rate of change in wheel speed being eliminated. This provides for an accurate determination of the optimum brake pressure producing the maximum possible brake torque for the tire-road surface interface coefficient of friction. By use of the estimated optimum pressure determined from the brake pressure existing at the time of the detected incipient wheel lockup condition, the rate of convergence on the optimum brake pressure is increased.

The pressure to the wheel brake is then established to produce the optimum brake pressure and the wheel-to-vehicle speed ratio that existed at the time the peak brake torque was identified.

DESCRIPTION OF THE DRAWINGS

The invention may be best understood by reference to the following description of a preferred embodiment and the drawings in which.

DESCRIPTION OF THE PREFERRED EMBODIMENT

The interlock brake system of this invention is described as incorporated into a brake-by-wire system of a vehicle. Specifically, the interlock brake system is incorporated into the control of the brake pressures of the rear, undriven wheels of the vehicle as specifically illustrated in the FIG. 9 to be described.

Figure 1:
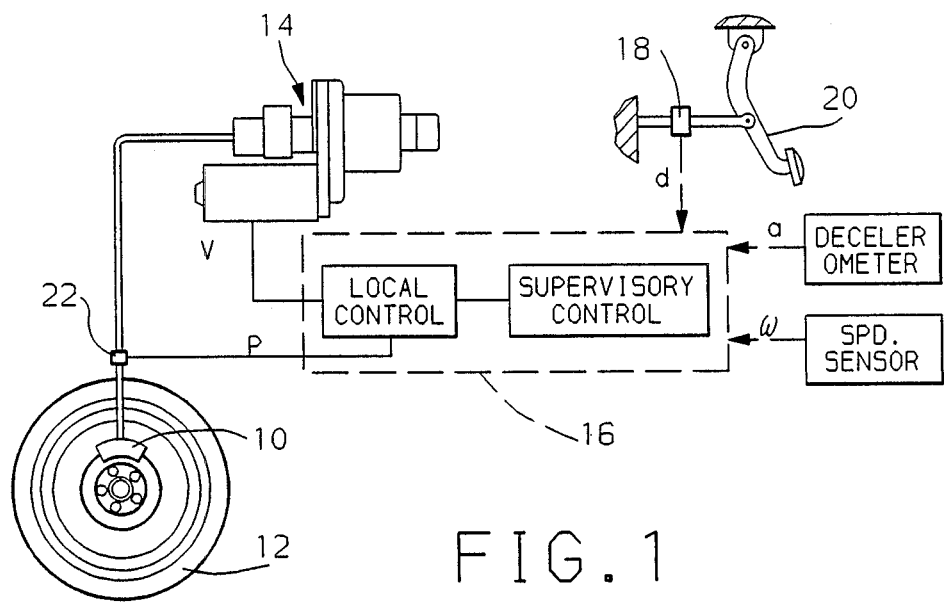
FIG. 1 is a general diagram of a brake-by-wire system for controlling the brakes of a vehicle.

A general overview of the brake-by-wire system for controlling the pressure applied to the brakes of the front and rear wheels of the vehicle is illustrated in FIG. 1. The control of a brake of a single wheel is illustrated, it being understood that the control of brakes of the remaining three wheels of the vehicle are identical thereto.

A standard wheel brake 10 for a wheel 12 is actuated by controlled hydraulic pressure from a motor driven pressure modulator 14. The pressure modulator 14 is controlled to establish a desired brake line pressure for operating the brake 10 by means of an electronic controller 16 that is responsive to the output of a brake pedal force sensor 18 providing a signal d that is a measure of the force applied to the vehicle brake pedal 20 and which comprises a vehicle operator deceleration command. The controller applies a voltage V to the pressure modulator 14 determined to produce a commanded brake pressure value.

Other signals provided to the electronic controller 15 include a vehicle deceleration signal a (deceleration being represented herein by positive values of a) provided by a conventional vehicle mounted decelerometer and a signal representing the rotational velocity $\omega$ of the wheel 12 is also provided to the electronic controller 16. The wheel velocity signal may be provided by any conventional wheel speed sensor. For example, the wheel speed sensor may be comprised of an electromagnetic sensor sensing the rotation of a toothed wheel rotated by rotation of the wheel 12. The resulting speed signal is a series of pulses having a frequency that is a measure of the wheel speed.

An additional input to the electronic controller 16 is provided by a brake line pressure sensor 22 that generates a signal representing brake pressure P applied to the brake 10 by the pressure modulator 14.

As previously indicated, a pressure modulator 14 is provided and controlled by the controller 16 for establishing a brake pressure at the brakes of each of the remaining three vehicle wheels. In this regard, signals corresponding to the aforementioned signals specifically related to each of the remaining wheels is also provided to the controller 16.

The electronic controller 16 provides control functions at two control levels. A low local control level function is provided for each wheel and functions to establish the brake pressure applied to the corresponding wheel brake 10. A high supervisory control function is also provided which receives information in regard to the vehicle system and coordinates the local control level function to achieve the overall braking objectives.

Figure 2:
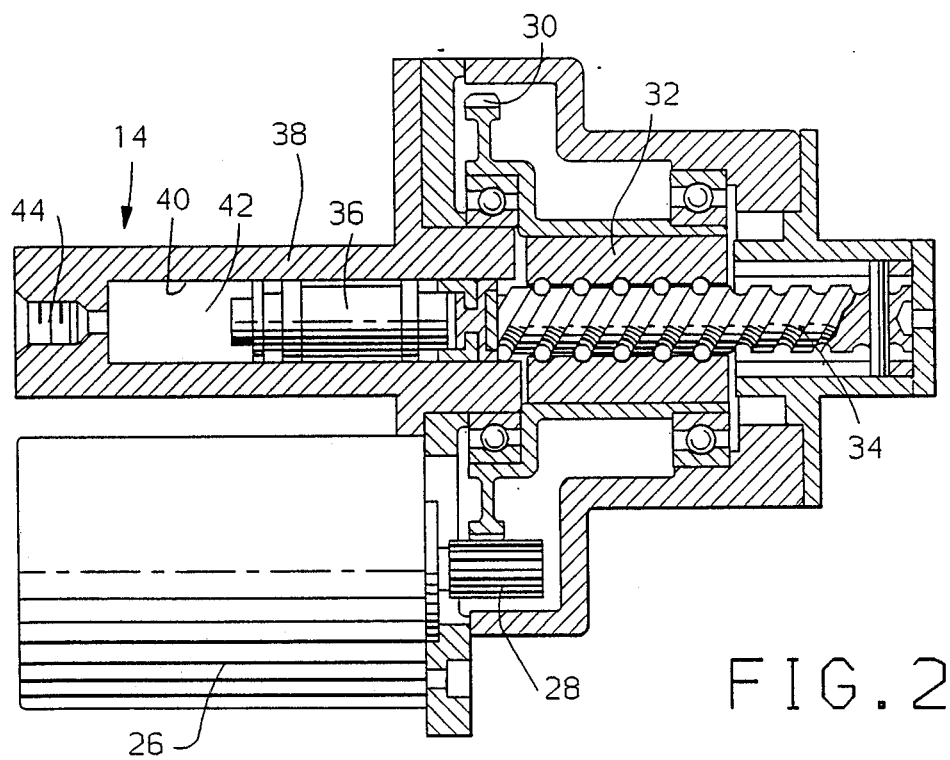
FIG. 2 is a cross-sectional view of a pressure modulator for each wheel for establishing brake pressure.

Referring to FIG. 2, the pressure modulator 14 for each vehicle wheel includes a DC torque motor 26 whose output shaft drives an input gear 28 which in turn rotatably drives an output gear 30. The drive member 32 of a ball screw actuator is secured for rotation with the output gear 30. The drive member 32 engages and axially positions the driven member 34 of the ball screw actuator. The driven member 34 drives a piston 36 to control the hydraulic pressure output of the pressure modulator 14. In summary, the torque output of the motor 26 is translated into a directly related hydraulic pressure output of the modulator 14 that is applied to the respective brake of the vehicle wheels.

As more particularly illustrated, the modulator 14 includes a housing 38 in which a cylinder 40 is formed. The piston 36 is reciprocally received in the cylinder 40 and defines therewith a chamber 42 that is filled with brake fluid. The modulator 14 has an outlet 44 from the chamber 42 which is connected to the wheel brake 10.

When a voltage is applied to the motor 26, the piston 36 is moved to apply brake pressure to the brake 10 until the hydraulic pressure acting on the piston 36 offsets the torque output of the motor 26 which is dependent upon the value of the applied voltage. In this embodiment, the ball screw and motor are back-drivable. In other words, the efficiency of the gears is high so that the motor output shaft is reverse driven by the hydraulic pressure acting on the piston 36 when it is greater than the torque output of the motor 26 until the hydraulic pressure is reduced to a level where it is overcome or offset by the torque output of the motor. Therefore, the pressure established by the modulator 14 may be increased or decreased simply by increasing or decreasing the voltage applied to the DC torque motor 26.

Figure 3:
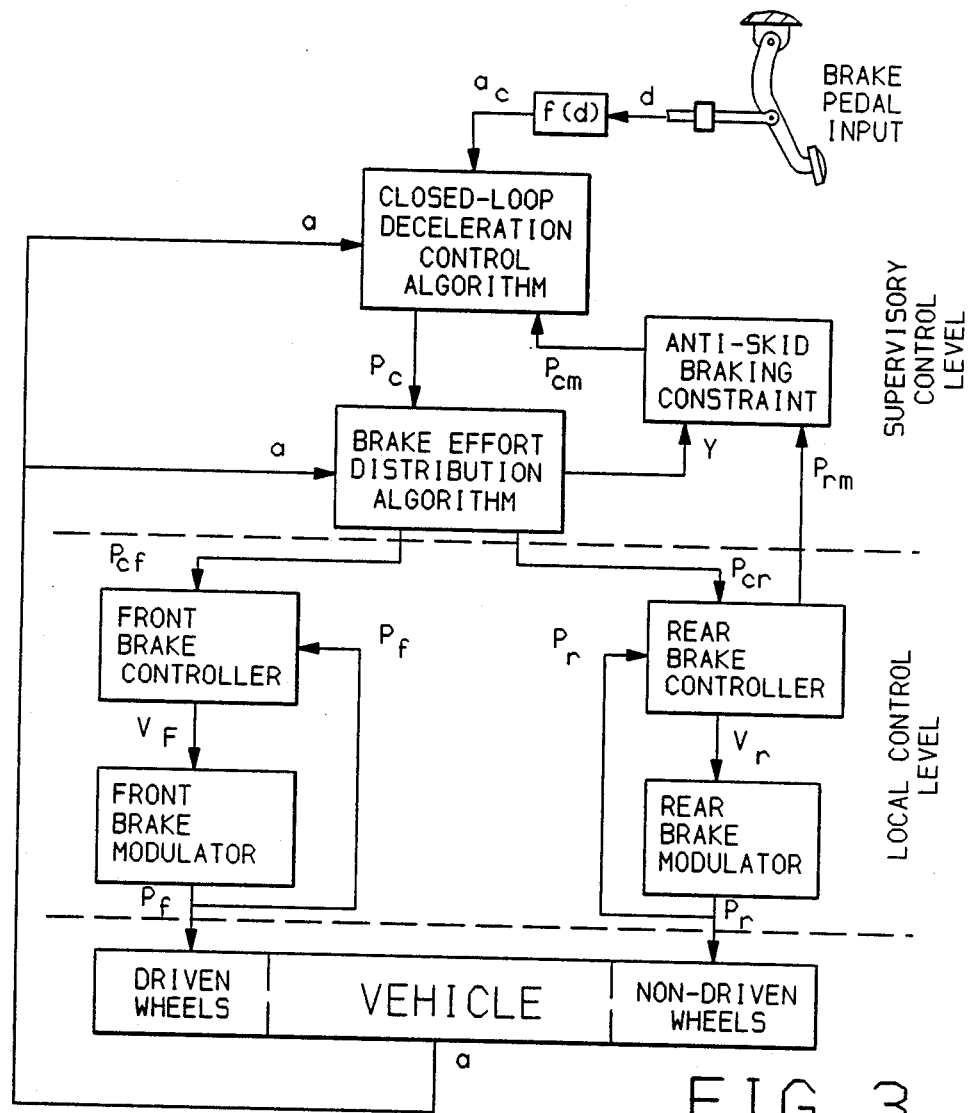
FIG. 3 is a block diagram illustrating the functions of the two control levels of the braking system of FIG. 1.

The hierarchical control strategy implemented by the electronic controller 15 of FIG. 1 is illustrated in FIG. 3. As previously indicated, the controller functions on two control levels. The supervisory control level responds to the driver input to the brake pedal as monitored by the force transducer 18 illustrated in FIG. 1. This input d is the vehicle operator's input to the brake system and represents the rate at which the operator would like the vehicle to decelerate. The supervisory controller then determines a commanded vehicle deceleration rate $a_c$ from the operator input value d, the relationship between d and the commanded deceleration rate $a_c$ being any arbitrary function $a_c = f(d)$ of the brake pedal input in order to program a desirable "feel" into the braking system.

The commanded deceleration rate is used as a reference trajectory for a closed loop deceleration control function which attempts to regulate the actual vehicle deceleration as measured by the vehicle mounted decelerometer around the desired value $a_c$. It should be noted that vehicle deceleration represented by the values a and $a_c$ are denoted by positive values. The closed loop deceleration control algorithm for establishing the actual vehicle deceleration a at the commanded value $a_c$ provides as an output value a commanded brake line pressure $P_c$ for the brake system.

The closed loop deceleration control algorithm of the supervisory controller takes the form of any conventional closed loop algorithm that may include, for example, proportional and integral control terms which adjust the value of the commanded brake pressure $P_c$ in direction to achieve the commanded vehicle deceleration value $a_c$.

It is well known that in order to achieve the maximum braking force (minimum stopping distance) in a vehicle, the ratio of the front to rear brake line pressures should be equal to the ratio of the normal forces (axle weights) on the front and rear wheels, respectively. As braking forces of the front and rear wheels of the vehicle are increased by application of brake pressures, a torque is produced about the vehicle's center of gravity. This torque will result in a lifting force on the rear wheels and a downward force on the front wheels. As a result, in order to achieve the maximum braking force, the ratio of the front to rear brake line pressures must be varied as a function of the rate at which the vehicle is being decelerated.

In general, the supervisory control function includes a brake effort distribution algorithm for determining the distribution of the brake effort between the front and rear brakes of the vehicle. This algorithm computes the fraction Y of the commanded brake pressure value $P_c$ that is to be allocated to the front wheel brakes. This fraction is determined by computing the normal force at the tire/ground interface for both the front and rear wheels. Assuming that $W_f(t)$ represents the computed normal force for the front axle and $W_r(t)$ represents the normal force for the rear axle, the optimal choice for the value of Y (the fraction of the commanded pressure $P_c$ to be allocated to the front brakes) is given by the expression:

$$Y/(1-Y)=W_f(t)/W_r(t). \quad (1)$$

Solving for Y, the following expression is obtained:

$$Y=W_f(t)/(W_f(t)+W_r(t)). \quad (2)$$

The values of $W_f(t)$ and $W_r(t)$ are obtained by summing the weight shift that occurs during braking with the known normal force K at steady state conditions at the respective front or rear axle in accord with the expression $$W(t)=K+\delta. \quad (3)$$

where $\delta$ is the deceleration dependent weight shift that occurs during braking. $\delta$ is computed by the following discrete time expressions:

$$\delta(k) = (G/\beta_o)(\alpha_o a(k) + \alpha_1 a(k-1) + \alpha_2 a(k-2)) + \quad (4)$$
$$(\beta_1/\beta_o)\delta(k-1) + (\beta_2/\beta_o)\delta(k-2)$$

where $\alpha_o=\omega_n^2 T^2$, $\alpha_1=2\omega_n^2 T^2$, $\alpha_2=\omega_n^2 T^2$, $\beta_o=4+4\ \omega_n T+\omega_n^2 T^2$, $\beta_1=8-2\omega_n^2 T^2$, and $\beta_2=4\omega_n T-4-\omega_n^2 T^2$. In the foregoing expression, $\omega_n$ is the natural frequency of the vehicle including the suspension spring constant and the unsprung mass, G is a constant that is a function of the vehicle, k denotes the discrete time index with k=0 denoting the sampling interval immediately before application of the brakes, T is the sampling rate and       is a damping coefficient. Once the value of       is computed for each of the front and rear axles, the normal force for the front and rear axles is then determined.

The values for the constants in the foregoing expressions are derived experimentally. A typical set of values is given by:

| Front Axle | Rear Axle |
|---|---|
| $\omega_n$ = 5.975 | $\omega_n$ = 8.255 |
| f = 0.245 | f = 0.415 |
| G = 322 | G = −380 |
| K = 9898 | K = 5046 |

From the computed normal forces for the front and rear axles, the value of Y representing the fraction of the commanded pressure $P_c$ that is allocated to the front brakes is determined. From this value, the brake effort distribution algorithm establishes a commanded pressure $P_{cf}$ for the front wheels and a commanded pressure $P_{cr}$ for the rear wheels in accord with the expressions $$P_{cf}=YP_c \text{ and} \quad (5)$$

$$P_{cr}=(1-Y)P_c. \quad (5)$$

At the local control level, each rear wheel has associated therewith a rear brake controller that establishes the brake pressure $P_r$ at the rear wheel equal to the commanded pressure value $P_{cr}$. In this regard, each rear brake controller includes a closed loop control function responding to the actual and commanded pressure values to provide a control voltage $V_r$ to the respective rear brake modulator including integral and proportional terms to establish the actual pressure $P_4$ equal to the commanded pressure $P_{cr}$.

Similarly, at the local control level, each front wheel has associated therewith a front brake controller that provides a control voltage $V_f$ to the respective front brake modulator including proportional and integral closed loop control terms to establish the pressure $P_f$ at the front wheels at the commanded value $P_{cf}$.

The front brake controllers simply provide for the closed loop control of the front wheel brake pressures at the commanded value $P_{cf}$. However, the rear brake controllers further provide for limiting the brake pressure applied to each of the rear brake modulators in accord with this invention so as to prevent a wheel lockup.

If the applied brake pressure results in the slip of one of the rear wheels exceeding the critical slip value at which the coefficient of friction between the wheel and road surface is a maximum, the wheel may begin to approach a lockup condition. If either of the local rear brake controllers detects that the corresponding rear wheel is approaching an incipient lockup condition, an estimate of the maximum rear brake line pressure that can be applied before the rear wheels begin to lock is made, the maximum pressure being denoted by the value $P_{rm}$. This maximum brake line pressure is provided to the supervisory controller which computes a limit $P_{cm}$ for the total brake line pressure. This maximum total brake line pressure $P_{cm}$ is determined by the expression $P_{cm}=(1/(1-Y))P_{rm}$ where Y is the fraction of the commanded brake pressure allocated to the front brakes. The commanded brake pressure value $P_c$ is then limited to the value of $P_{cm}$. Therefore, the commanded front brake pressure $P_{cf}$ established as previously described from the limited commanded brake pressure $P_c$ and the value of Y establishing the fraction of $P_c$ allocated to the front brakes results in a front brake pressure being established that prevents an incipient wheel lockup condition at the front wheels.

One of the advantages of the aforementioned hierarchical control strategy is that in the event of the failure of one of the brake modulators, the brake pressures provided to the remaining three brake modulators are adjusted so as to maintain the commanded deceleration rate.

Figure 4:
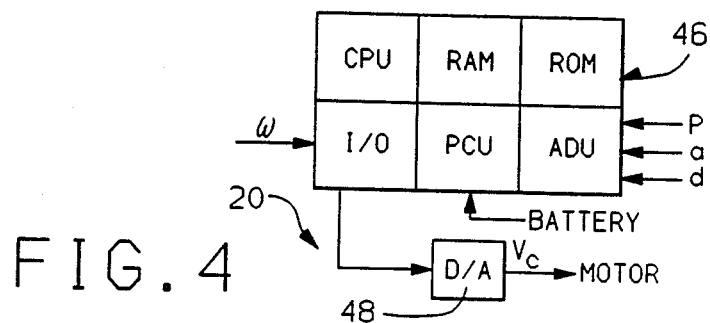
FIG. 4 is a diagram of the electronic controller of FIG. 1.

As specifically illustrated in FIG. 4, the electronic controller 16 in the present embodiment takes the form of a standard digital computer 46 providing an output to a standard digital-to-analog converter 48 for each wheel brake, only one of the digital-to-analog converters being illustrated. As indicated, the digital computer 46 is standard in form and includes a central processing unit (CPU) which executes an operating program permanently stored in a read only memory (ROM) which also stores tables and constants utilized in controlling the pressure to be applied to the brake 10 of each of the wheels. Contained within the CPU are conventional counters, registers, accumulators, flag flip flops, etc., along with a clock which provides a high frequency clock signal.

The computer 46 also includes a random access memory (RAM) into which data may be temporarily stored and from which data may be read at various address locations determined in accord with the address stored in the ROM. A power control unit (PCU) receives battery voltage and provides regulated power to the various operating circuits in the computer 46. The computer 46 further includes an input/output circuit (I/O). In controlling the individual brakes 10 of the wheels 12, the computer outputs a digital signal to the respective digital-to-analog converter 48 representing the desired voltage to be applied to the respective brake modulator to establish the commanded brake pressure.

The I/O also includes an input counter section which receives a pulse output from each of the wheel speed sensors representing the respective wheel velocity V, one of such inputs being illustrated. Wheel speed V is then determined such as by determining the number of clock pulses between wheel speed pulses.

An analog-to-digital unit (ADU) is included which provides for the measurement of analog signals. The analog signals representing conditions upon which the brake pressure to the brakes 10 is based are supplied to the ADU. In the present embodiment, those signals include the brake line pressure of each of the wheel brakes 10, one such value being illustrated. In regard to FIG. 3, these pressure values are the value $P_f$ for each of the front driven wheels and $P_r$ for each of the rear non-driven wheels.

Additional signals provided to the ADU include the acceleration signal a provided by the vehicle accelerometer and the brake pedal force d provided by the force sensor 18 representing the driver deceleration command. The various analog signals are sampled and converted under the control of the CPU and stored in respective ROM designated RAM memory locations. A flow chart of a typical control algorithm according to the invention is illustrated in FIGS. 5–9 which represents the portion of the program embodied in the ROM of the digital computer 46 for control of the pressure applied to each of the brake pressure modulators 14 for the two front driven wheel brakes and the two rear non-driven wheel brakes. The description of the program includes reference numerals within angle brackets < > which refer to the flow chart blocks corresponding to the described steps. The computer program represented by the flow charts is repeated at predetermined intervals such as 5 msec. intervals.

Figure 6:
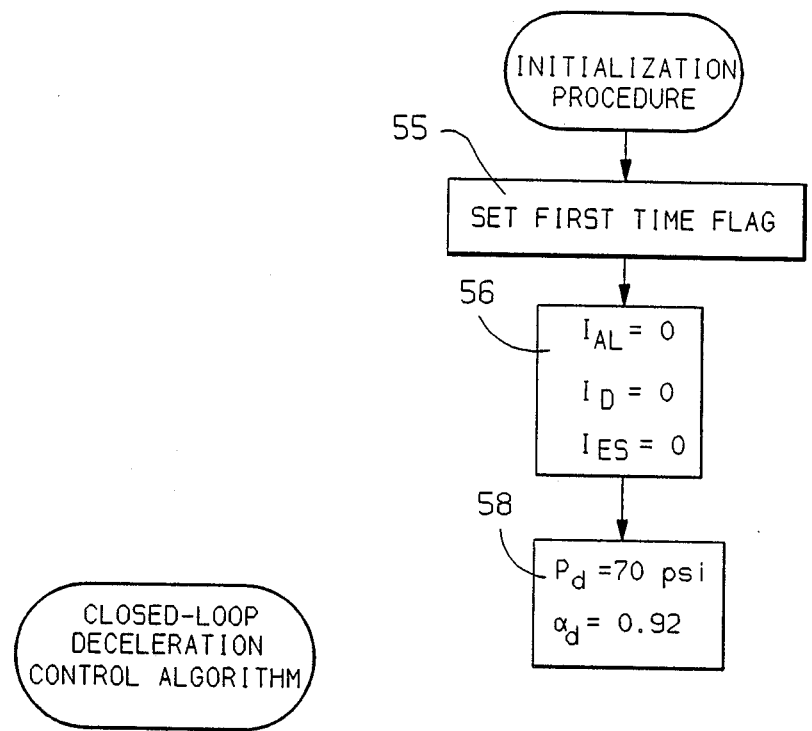

At the start of the program, the program repeatedly determines whether or not the vehicle driver has operated the brake pedal 20 to command vehicle deceleration <50>. This may be determined by monitoring the output d of the force sensor 18. The program then determines if this is the first time the brake pedal is operated such as by sampling the state of a first time flag <52>. If the program determines this is the first time the brake pedal has been operated as represented by a reset condition of the first time flag, an initialization procedure illustrated in FIG. 6 is undertaken to provide for system initialization whereat initial values are established and the initial flag states are established <54>. This initialization procedure is more specifically illustrated in FIG. 6 wherein the procedure sets the first time flag <55>, initializes an antilock flag IAL, a dump flag $I_D$ and an estimation flag IES to reset conditions <56> and initializes the values of brake pressure $P_d$ and a speed ratio term $\alpha_d$ (to be utilized in the pressure dump routine when the brake pressure is being limited during antilock brake control) to predetermined values <58>.

Figure 5:
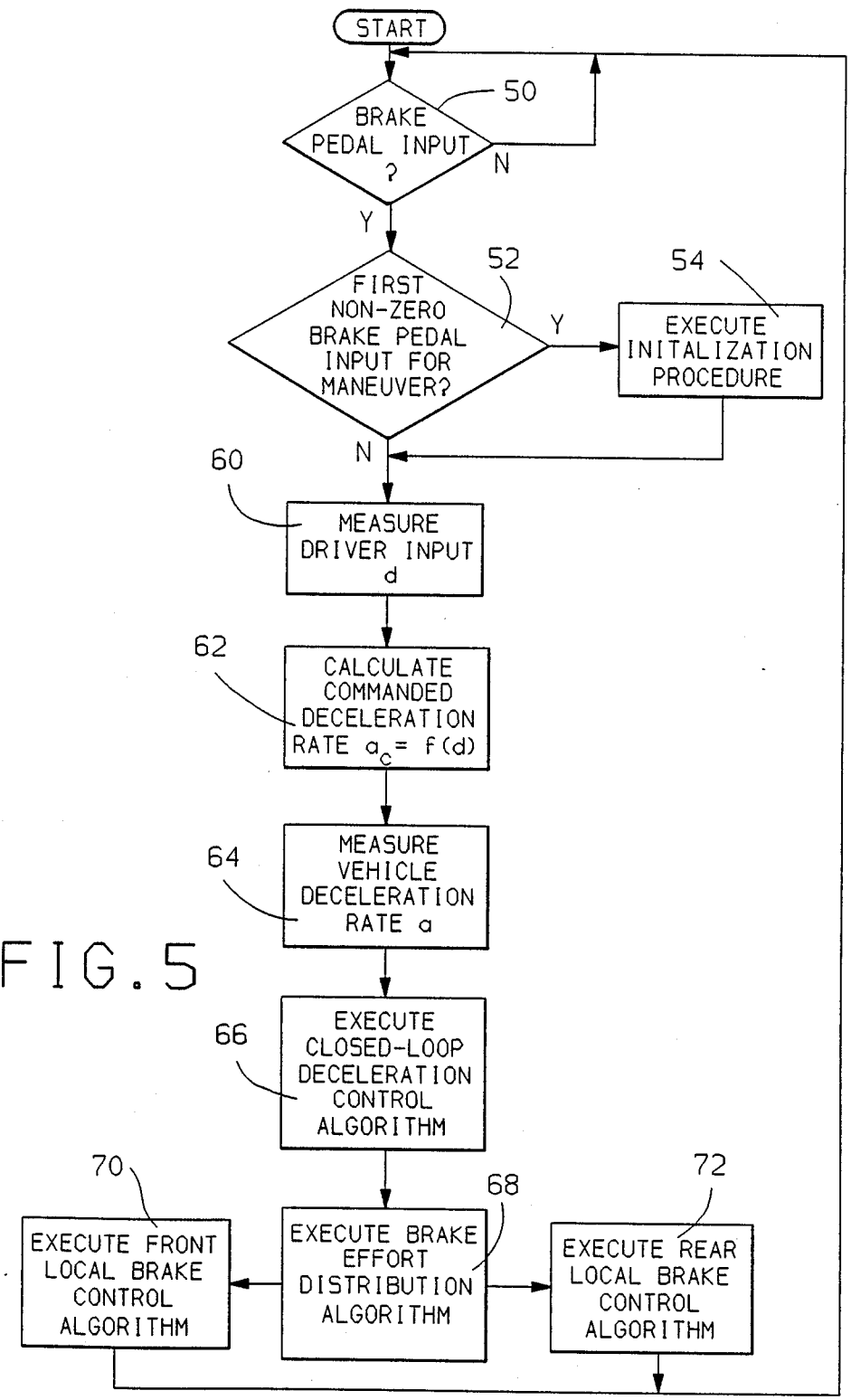
FIGS. 5–9 comprise a flow chart illustrating the operation of the controller of FIG. 4.

After the initialization procedure, or after the first time the routine of FIG. 5 is executed following a drive input to the brake pedal 20, the value of the driver input represented by the output d of the force sensor 18 is measured <60>. The operator commanded deceleration rate $a_c$ is then determined in accord with a predetermined function f(d) <62>. The function f(d) may be any desired function establishing a desired feel of the braking system.

The vehicle deceleration rate a is next measured by measuring the output of the vehicle decelerometer. Based on this value, closed loop control of the vehicle deceleration so as to establish correspondence between the measured deceleration rate a and the commanded deceleration rate $a_c$ is executed <66>. The result of this routine is the commanded brake pressure value $P_c$ established at the supervisory control level illustrated in FIG. 3.

The program then determines the allocation of the commanded brake pressure $P_c$ between the front and rear wheel brakes. The result of this step is the determination of the commanded front wheel brake pressure $P_{cf}$ and the commanded rear wheel brake pressure $P_{cr}$ to be utilized at the local control level <68>.

The foregoing steps generally comprise the supervisory control level of the hierarchical brake control system of this invention. The details of the closed loop deceleration algorithm <66> and the brake distribution algorithm <68> will be described in greater detail in reference to FIGS. 7 and 8. The output established by the supervisory controller are the commanded front and rear brake line pressures $P_{cf}$ and $P_{cr}$ to be utilized at the local control level to establish the commanded brake pressures at the respective front and rear wheels of the vehicle.

Next, the routines at the local control level are executed to establish the commanded brake pressure $P_{cf}$ at the front driven wheels of the vehicle <70> and to establish the commanded brake pressure $P_{cr}$ at the rear wheels of the vehicle <72>. Following execution of the routines at the local control level, the program is repeated as previously described.

Figure 7:
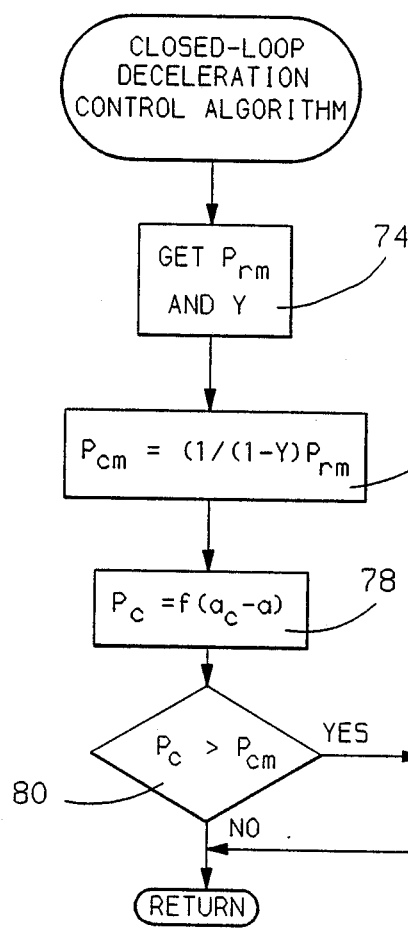

Referring to FIG. 7, the closed loop deceleration control algorithm <66> is illustrated. As previously indicated, this algorithm functions at the upper supervisory control level to establish a commanded brake pressure for each of the front and rear wheels of the vehicle to achieve the commanded deceleration rate $a_c$ established by the vehicle driver. This algorithm first retrieves the maximum rear brake line pressure $P_{rm}$ that can be attained before the two rear non-driven wheels will lock and retrieves the value of the distribution coefficient Y representing the proportioning of the commanded brake pressure between the front and rear wheel brakes <74>. The value of $P_{rm}$ is determined as will be described by the rear brake control algorithm <72> and specifically described in reference to FIG. 9 and the coefficient Y is determined by the brake effort distribution algorithm <68>.

From the retrieved values of $P_{rm}$ and Y, the routine then computes the maximum allowable brake line pressure $P_{cm}$ of the commanded brake pressure $P_c$. Based on the knowledge of the maximum allowable rear wheel brake pressure $P_{rm}$ and the current proportioning value Y, the maximum allowable value of $P_c$ is determined from the expression $$P_{cm}=(1/(1-Y))P_{rm}<76>. \qquad (6)$$

The routine next provides closed loop adjustment of the pressure command value $P_c$ as a function of the error between the commanded acceleration $a_c$ and the actual measured acceleration value a <78>. The function may include conventional integral and proportional terms to establish a command pressure $P_c$ resulting in the actual vehicle deceleration a attaining the commanded value $a_c$.

If the determined commanded pressure value $P_c$ is determined to be greater than the maximum allowable value $P_{cm}$ <80>, $P_c$ is set equal to $P_{cm}$ <82>. The commanded brake pressure value $P_c$ resulting from the routine of FIG. 7 is then utilized in the brake effort distribution algorithm <68> to apportion the commanded brake pressure $P_c$ between the front and rear wheel brakes. This routine is specifically described in FIG. 8.

Figure 8:
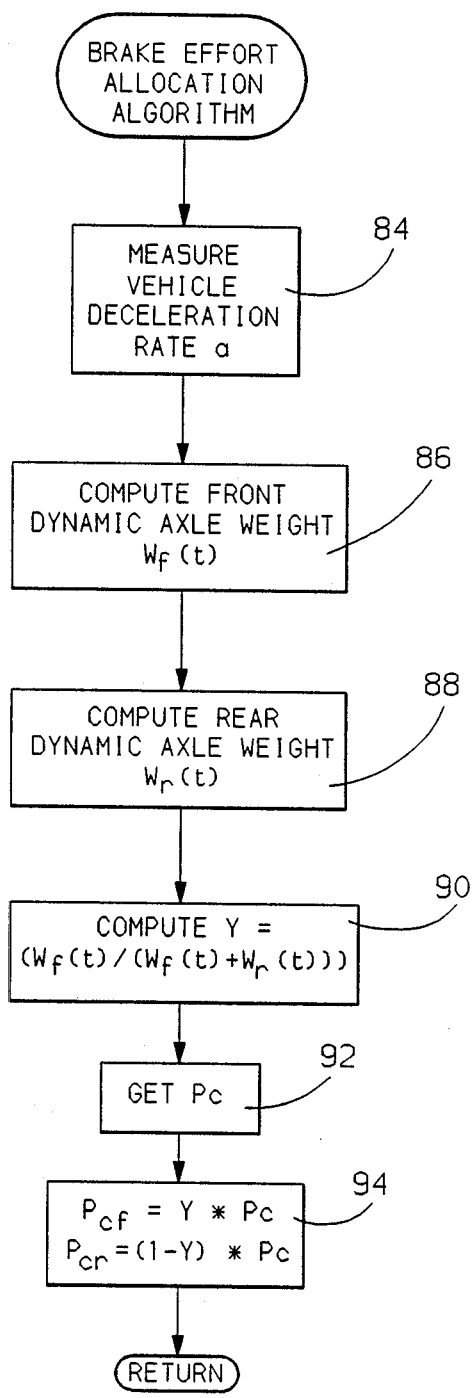

Referring to FIG. 8, the vehicle deceleration rate a is measured <84> to be used in computing the front and rear dynamic axle weights $W_f(t)$ in accord with equations 3 and 4 <86>. Similarly, the rear dynamic axle weight $W_r(t)$ is determined using the same equations <88>. From these two dynamic axle weight values, the proportion of the commanded brake pressure to be distributed to the front and rear brakes is determined by computing in accord with equation 2 the value of Y which is the fraction of the commanded brake pressure to be allocated to the front wheel brakes <90>. The commanded pressure established by the closed loop deceleration control algorithm of FIG. 7 is then retrieved <92> and utilized to determine the commanded front wheel brake pressure $P_{cf}$ and the commanded rear brake pressure $P_{cr}$ based on the proportioning factor Y as previously described. These front and rear brake pressure command values are then utilized at the local control level to establish the front and rear wheel brake pressures.

Figure 9A:
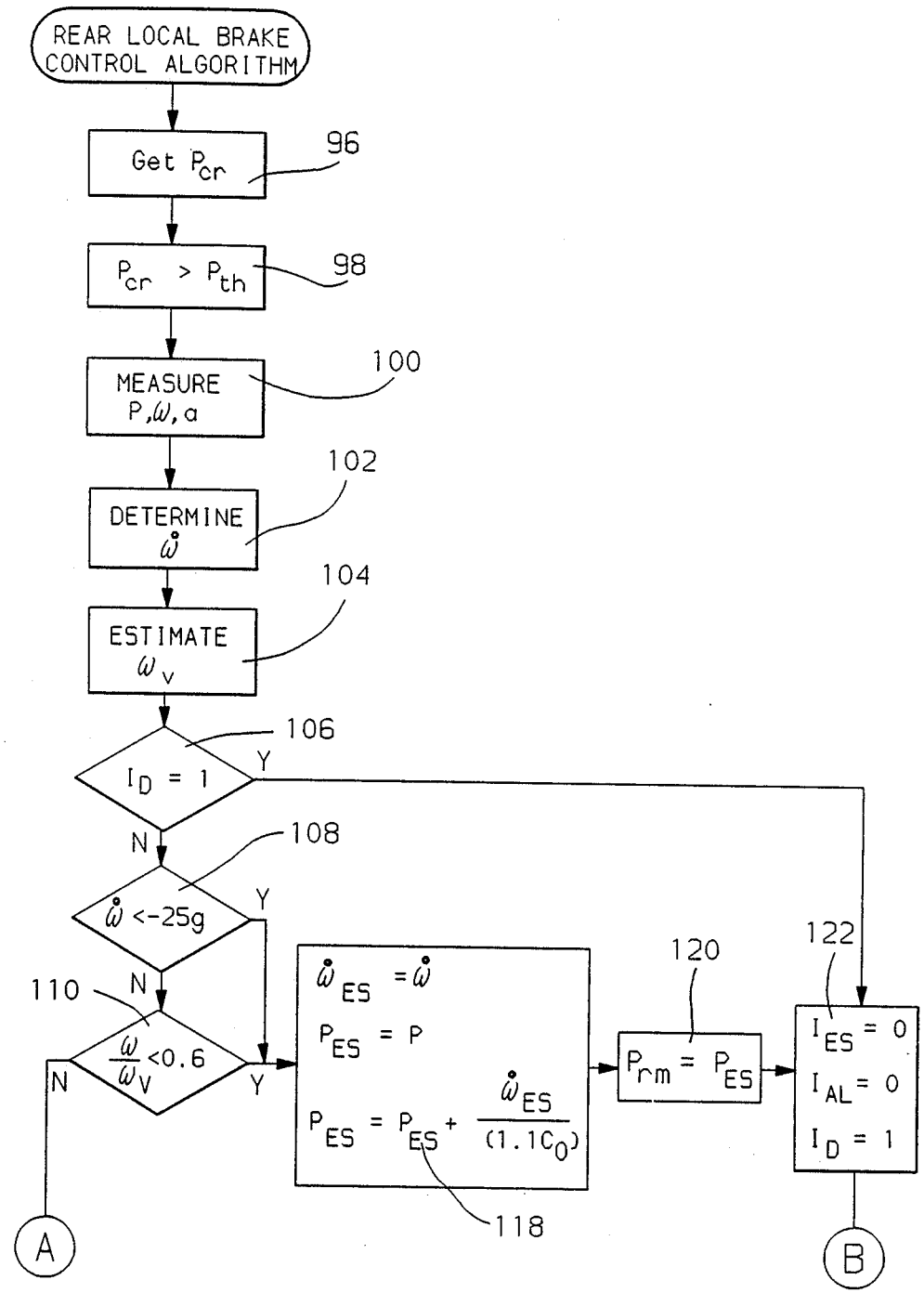

The rear local brake control algorithm at the local control level incorporating the principles of this invention is illustrated in FIG. 9. The routine of FIG. 9 is executed for each rear wheel thereby controlling the pressure applied to each rear wheel brake independently. The rear local brake control algorithm first retrieves the value of the commanded rear brake control pressure value $P_{cr}$ <96> and compares it with a noise threshold level $P_{th}$ <98>. If the pressure command value is greater than the noise threshold, the values of the rear wheel brake pressure, wheel speed and the vehicle deceleration are measured via the ADU and the I/O <100>. From the last two measured values of wheel speed, the wheel acceleration ω is determined <102> after which the speed of the vehicle is estimated <104>. The speed of the vehicle is represented by the speed $\omega_v$ of a hypothetical unbraked wheel. The estimation of this vehicle wheel speed value may be based upon the last determined value of vehicle speed that was previously measured and stored and vehicle deceleration. Alternatively, the vehicle speed may be estimated based upon wheel speed and wheel deceleration values such as illustrated in the U.S. Pat. No. 4,664,543 issued May 12, 1987 and assigned to the assignee of this invention.

The program then determines whether or not the brake control is set in a dump mode represented by the set state of a dump flag $I_D$ <106>. If the brake system is not in the dump mode, the program determines whether or not an incipient wheel lock condition exists at the rear wheel as represented by the wheel decelerating greater than a predetermined value such as −25 g <108> or by the wheel-vehicle speed ratio $\omega/\omega_v$ being less than a predetermined constant such as 0.6 representing 40% slip >110>. If the program determines that an incipient wheel lock condition at the rear wheel does not exist and the rear brake control is not placed in an estimation mode (a reset condition of an estimation mode flag $I_{ES}$) <112> or in an antilock mode (a reset condition of an antilock mode flag $I_{AL}$) <114> a power brake control mode is executed <116> wherein the voltage command value $V_r$ is provided to the digital-to-analog converter 48 which in turn applies the commanded voltage to the respective motor 26 of the rear brake modulator 14 to establish the commanded rear brake pressure $P_{cr}$. The voltage value $V_r$ may be adjusted by integral and proportional control terms in direction to achieve the commanded pressure $P_{cr}$ at the rear brake. The maximum allowable rear brake pressure value $P_{rm}$ is then set to some high value $P_k$ higher than any value of the commanded rear pressure $P_{cr}$ to allow the value of $P_c$ to be established unlimited.

As long as an incipient wheel lockup condition is not sensed, this power brake control mode is repeatedly executed to maintain the pressure applied to the rear brake at the commanded pressure $P_{cr}$. However, if the pressure applied to the rear brake becomes excessive resulting in the wheel approaching an incipient wheel lockup condition, the condition is sensed <108> <110> and various parameters existing at that point in time are stored. Particularly, the value of a pressure $P_{ES}$ to be used in an estimation mode to be described is first set to the value of the measured rear brake pressure $P_r$, the value of wheel acceleration $\omega_{ES}$ (having a negative value) to be used in the estimation mode is set equal to the value measured at step 102 and the value of the pressure value $P_{ES}$ is adjusted based on the expression $$P_{ES}=P_{ES}+\dot{\omega}_{ES}/K_1 C_o, \qquad (7)$$

where $C_o$ is a brake gain constant dependent upon brake system parameters such as the coefficient of friction of the brake linings <118>.

The unadjusted value of $P_{ES}$ is substantially larger than the brake pressure resulting in the maximum possible braking torque for the road surface due to the forces associated with wheel deceleration. The value of $P_{ES}$ is adjusted as above described to substantially the value producing the maximum possible braking torque that can be applied before the rear wheels will begin to lock. $K_1$ is greater than unity (such as 1.1) to assure the adjusted value of $P_{ES}$ is at least greater than the value producing the maximum possible braking torque so that the value producing the maximum braking torque can later be identified in the estimation mode to be described.

The maximum allowable commanded rear brake pressure value $P_{rm}$ is then set equal to the value of $P_{ES}$ determined at the step 118 <120>. This has the immediate effect of limiting the commanded front brake pressure $P_{cf}$ via the supervisory controller as previously described.

In order to prevent the wheels from locking, the local rear brake controller is then placed in a pressure dump mode by setting the dump flag $I_D$ <122>. The pressure is then dumped to allow recovery from the incipient lockup condition by controlling the voltage $V_r$ applied to the motor 26 of the rear brake modulator 14 at a value to establish the predetermined dump pressure value $P_d$ and a predetermined wheel speed ω defined by $\alpha_d \omega_v$ where $\alpha_d$ is a predetermined value of the speed ratio $\omega/\omega_v$. The values of $P_d$ and $\alpha_d$ are established in the initialization routine of FIG. 6 <124>. These constants may be in one embodiment 70 psi and 0.96 respectively. The value of $V_r$ is established in accord with the following expression to establish the desired dump brake pressure value $P_d$ and the desired wheel speed value:

$$V_r = F_1(P - P_d) + F_2(\omega - \alpha_d \int_v) \tag{8}$$

where $F_1$ and $F_2$ are gain coefficients to establish a high gain feedback to regulate the controlled values of $P_d$ and the wheel speed $\omega$ defined by $\alpha_d \omega_v$, to the desired values. The relationship of $F_1$ and $F_2$ may be controlled to place greater weight on the control of pressure or wheel speed. For example, greater weight may be placed on the controlled parameter having the greatest measurement accuracy.

While the brake pressure is being controlled as per step 124 to reduce brake pressure and to provide for wheel speed recovery from the incipient wheel lockup condition, the system continuously monitors the wheel slip and wheel acceleration to determine recovery from the incipient wheel lockup conditions. Recovery from the incipient wheel lockup condition is represented by the speed ratio $\omega/\omega_v$ becoming greater than a predetermined constant such as 0.92 <126> or when wheel acceleration becomes greater than a predetermined constant such as 25 g <128>. As long as these conditions do not represent recovery from the incipient wheel lockup condition, the dump routine is repeatedly entered from step 106 to continue to allow the wheel speed to recover from the incipient wheel lockup condition.

When the recovery is sensed <126> or <128>, the routine is placed in an estimation mode by setting an estimation mode flag $I_{ES}$ <130>. When this mode condition is sensed, the program sets the commanded rear brake pressure $P_{cr}$ at the minimum of the current value of the commanded brake pressure or the pressure $P_{ES}$ established at the step 118 <132>. While brake pressure is being limited, the value of $P_{ES}$ will be selected by step 132. The voltage $V_r$ provided to the motor 26 of the rear brake modulator 14 is then controlled to a value to establish the commanded rear brake line pressure $P_{cr}$ <132>. The control of this voltage is identical to the control during the power brake mode described at step 116 and similarly may include proportional and integral control terms to precisely establish the rear brake pressure $P_r$ equal to the commanded value $P_{cr}$.

As the step 132 increases the brake pressure $P_r$ toward the commanded value $P_{cr}$, the estimation routine determines the braking torque per unit of wheel inertia T as defined by the expression $$T = C_o P + \omega, <134>. \tag{9}$$

The peak value $T_M$ of the determined braking torque T as the brake pressure is increased to $P_{cr}$ is determined by comparing the calculated value with a stored value of $T_M$ <136>. If the value is greater than the stored value, the stored value is updated with the new larger value determined at step 134 <138>.

When the difference between the determined value of braking torque T and the stored value $T_M$ becomes negative, then the wheel slip is at the critical slip value establishing the maximum possible tractive force between the wheel and road surface. At this point in time, the speed ratio $\omega/\omega_v$ is the optimum ratio $\alpha^*$ corresponding to the critical slip and the optimum brake pressure establishing the maximum possible brake torque $T_M$ may be determined. The optimum brake pressure $P^*$ is determined in accord with the expression $$P^* = T_M/C_o. \tag{10}$$

Wheel deceleration during reapplication of brake pressure in the estimation mode may be significant and is therefore a factor in the calculation of brake torque at step 134. However, in determining the optimum pressure value $P^*$ that will establish the peak brake torque $T_M$, wheel dynamics are ignored because the rate of change in wheel speed is negligible when the pressure is controlled steady state at the optimum pressure $P^*$ in the antilock braking mode to be described. The optimum values $\alpha^*$ and $P^*$ are stored for use in the antilock braking mode <140>. The maximum rear brake pressure value $P_{rm}$ is then set equal to the optimum brake pressure $P^*$ <142>. By setting the commanded brake pressure value $P_{cr}$ to the value of $P_{ES}$ at step 132, ($P_{ES}$ being an estimate of the brake pressure just greater than the value producing the maximum torque value $T_M$) the rate of convergence on the optimum pressure value $P^*$ is increased.

A voltage $V_o$ representing the steady state motor voltage required to achieve the optimum brake pressure value $P^*$ is determined by the expression $P^*/G$ where G is a predetermined constant representing the relationship between the voltages applied to the motor 26 and the resulting pressure established thereby <144>. The local rear brake controller is then placed in an antilock mode by setting an antilock mode flag $I_{AL}$ and resetting the remaining mode flags <146>.

When an antilock mode is sensed <114>, an antilock control algorithm is executed that first determines whether or not the rear wheel has experienced a transition from a low to high coefficient of friction road surface. This is accomplished by first establishing a braking torque value $T_m$ that is a predetermined fraction such as 0.8 of the actual brake torque value <148>. As long as this value is less than the previously identified peak brake torque value $T_M$ during the estimation mode, the coefficient of friction of the road surface over which the rear wheel is traveling has not significantly increased.

As long as the program determined that the road surface coefficient of friction has not increased <150> and that the commanded rear brake pressure is not less than the optimum pressure $P^*$ <151>, the voltage $V_r$ provided to the motor of the rear brake modulator 14 is controlled to regulate the rear brake pressure $P_r$ at the optimum brake pressure value $P^*$ and the wheel speed $\omega_r$ at the optimum value $\alpha^* \omega_v$ <152>. In general, the pressure is regulated in accord with the control law $$P_r = P^* + F_1(P - P^*) + F_2(\omega - \alpha^* \omega_v). \tag{11}$$

Specifically, the voltage $V_r$ applied to the motor of the brake modulator to implement the control law is defined by the expression:

$$V_r = V_o + F_1(P - P^*) + F_2(\omega - \alpha^* \omega_v), \tag{12}$$

where the values of $F_1$ and $F_2$ are the gain values as previously described in regard to step 124 in the dump mode routine. By so controlling the voltage $V_r$ during the antilock mode, the system braking performance is insensitive to parameter variations such as vehicle speed, road surface conditions and coefficient of friction of the brake pads of the wheel brakes.

If the road surface coefficient of friction should increase such that the value of $T_m$ calculated at step 148 becomes greater than the peak torque value $T_M$ attainable on the lower coefficient of friction surface, <150> or if the commanded rear brake pressure $P_{cr}$ becomes less than the optimum pressure <151>, the routine ends the antilock mode by resetting the antilock mode flag $I_{AL}$ <154>. The rear local brake control algorithm is then returned to the power brake mode wherein the step 116 is executed to establish the voltage $V_r$ be applied to the motor of the rear brake modulator 14 to control the rear brake pressure $P_r$ at the commanded rear brake pressure $P_{cr}$ as previously described.

As previously indicated, the rear local brake control algorithm of FIG. 9 is executed for each of the left and right rear non-driven wheels of the vehicle. The control of the pressure to the front wheel brakes are provided only through the execution of a power brake routine as illustrated at step 116 of FIG. 9. In this case, the voltage applied to the front wheel brakes is controlled in accord with the commanded brake pressure value $P_{cf}$ and the measured value in accord with proportional and integral control terms so that the pressure $P_f$ applied to the front wheel brakes is controlled to the commanded value. Even though the front brakes are not controlled via an antilock control algorithm as in the local rear brake control algorithm, the brake pressure applied to the front wheel brakes are controlled so as to prevent lockup through the relationship of the front and rear brake pressures that are established by the proportioning factor Y. As described in reference to FIG. 9, the maximum allowable rear brake pressure $P_{rm}$ is set at a value establishing the peak braking torque for the existing road surface condition. Through the brake effort allocation algorithm of FIG. 8, the commanded brake pressure $P_c$ and the commanded front brake pressure $P_{cf}$ derived therefrom (taking into consideration the proportioning factor Y) are established at values resulting in the maximum brake torque for the road surface condition being established at the front wheels without the requirement of the execution of an antilock brake control routine.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for controlling the brake pressure applied to the brake of a wheel traveling over a road surface to limit the wheel slip between the wheel and the road surface, the system comprising, in combination:

means for determining the angular acceleration $\dot{\omega}$ of the wheel;
   means for detecting an incipient wheel lockup condition resulting from the value of slip between the wheel and the road surface exceeding a critical slip value;
   means for dumping the brake pressure in response to the detected incipient wheel lockup condition to allow the wheel to recover from the incipient wheel lockup condition;
   means for reapplying brake pressure to the brake following the recovery from the incipient wheel lockup condition;
   means for determining the torque T tending to accelerate the wheel during application of brake pressure in accord with the expression $T = C_o P + \dot{\omega}$ where $C_o$ is a brake system constant, P is the brake pressure applied to the brake and $\dot{\omega}$ is the angular acceleration of the wheel;
   means for detecting a peak value $T_M$ in the determined torque T;
   means storing an optimum brake pressure value $P^*$ having a value defined by the expression $P^* = T_M/C_o$; and
   means for controlling the pressure to the brake to the value $P^*$, whereby the wheel brake pressure is established following an incipient wheel lockup condition to a value producing substantially the peak braking torque.

2. A system for controlling the brake pressure applied to the brake of a wheel traveling over a road surface to limit the wheel slip between the wheel and the road surface, the system comprising, in combination:

means for determining the angular acceleration $\dot{\omega}$ of the wheel;
   means for detecting an incipient wheel lockup condition resulting from the brake pressure applied to the brake exceeding an optimum pressure value that would establish a maximum possible torque value tending to accelerate the wheel during application of brake pressure;
   means for storing a value $P_{ES1}$ of the brake pressure corresponding in time with the detected incipient wheel lockup condition;
   means for dumping the brake pressure in response to the detected incipient wheel lockup condition to allow the wheel to recover from the incipient wheel lockup condition;
   means for reapplying brake pressure to the brake following the recovery from the incipient wheel lockup condition to a value $P_{ES2}$ equal to $P_{ES1} + \dot{\omega}/kC_o$ where $\dot{\omega}$ is the angular acceleration of the wheel, $C_o$ is a brake system constant and k is a constant greater than unity, the value of $P_{ES1} + (\dot{\omega}/C_o)$ being an estimate of the optimum pressure value;
   means for determining the torque T tending to accelerate the wheel during reapplication of brake pressure in accord with the expression $T = C_o P + \dot{\omega}$ where P is the brake pressure applied to the brake;
   means for detecting a peak value $T_M$ in the determined torque T, $T_M$ comprising a measure of the maximum possible torque value tending to accelerate the wheel;
   means for storing a brake pressure value $P^*$ having a value defined by the expression $P^* = T_M/C_o$, $P^*$ being a measure of the optimum brake pressure value establishing the maximum possible torque value; and
   means for controlling the pressure to the brake to the value $P^*$, whereby the wheel brake pressure is established following an incipient wheel lockup condition to a value producing substantially the maximum possible braking torque.

3. A system for controlling the brake pressure applied to the brake of a wheel traveling over a road surface to limit the wheel slip between the wheel and the road surface, the system comprising, in combination:

means for sensing the speed $\omega$ of the wheel;

means for determining the hypothetical wheel speed $\omega_v$ of an unbraked wheel of the vehicle;

means for determining the angular acceleration $\dot{\omega}$ of the wheel;

means for detecting an incipient wheel lockup condition resulting from the brake pressure applied to the brake exceeding an optimum pressure value that would establish a maximum possible torque value tending to accelerate the wheel during application of brake pressure;

means for storing a value $P_{ES1}$ of the brake pressure corresponding in time with the detected incipient wheel lockup condition;

means for dumping the brake pressure in response to the detected incipient wheel lockup condition to allow the wheel to recover from the incipient wheel lockup condition;

means for reapplying brake pressure to the brake following the recovery from the incipient wheel lockup condition to a value $P_{ES2}$ equal to $P_{ES1}+(\dot{\omega}/kC_o)$ where $\dot{\omega}$ is the angular acceleration of the wheel, $C_o$ is a brake system constant and k is a constant greater than unity, the value of $P_{ES1}+(\dot{\omega}/C_o)$ being an estimate of the optimum pressure value;

means for determining the torque T tending to accelerate the wheel during reapplication of brake pressure in accord with the expression $T=C_oP+\dot{\omega}$ where P is the brake pressure applied to the brake;

means for detecting a peak value $T_M$ in the determined torque T, $T_M$ comprising a measure of the maximum possible torque value tending to accelerate the wheel;

means for storing a speed ratio value $\alpha^*$ equal to $\omega/\omega_v$ corresponding in time to the detection of the peak value $T_M$;

means for storing a brake pressure value $P^*$ having a value defined by the expression $P^*=T_M/C_o$, $P^*$ being a measure of the optimum brake pressure value establishing the maximum possible torque value; and means for controlling the pressure to the brake to a value defined by the expression $P^*+F_1(P-P^*)+F_2(\omega-\alpha^*\omega_v)$, whereby the wheel brake pressure is established following an incipient wheel lockup condition to a value producing substantially the maximum possible braking torque.

4. A method for controlling the brake pressure applied to the brake of a wheel traveling over a road surface to limit the wheel slip between the wheel and the road surface, the method comprising the steps of:

determining the angular acceleration $\omega$ of the wheel;

detecting an incipient wheel lockup condition resulting from the brake pressure applied to the brake exceeding an optimum pressure value that would establish a maximum possible torque value tending to accelerate the wheel during application of brake pressure;

storing a value $P_{ES1}$ of the brake pressure corresponding in time with the detected incipient wheel lockup condition;

dumping the brake pressure in response to the detected incipient wheel lockup condition to allow the wheel to recover from the incipient wheel lockup condition;

reapplying brake pressure to the brake following the recovery from the incipient wheel lockup condition to a value $P_{ES2}$ equal to $P_{ES1}+(\dot{\omega}/kC_o)$ where $\dot{\omega}$ is the angular acceleration of the wheel, $C_o$ is a brake system constant and k is a constant greater than unity, the value of $P_{ES1}+(\omega/C_o)$ being an estimate of the optimum pressure value;

determining the torque T tending to accelerate the wheel during reapplication of brake pressure in accord with the expression $T=C_oP+\dot{\omega}$ where P is the brake pressure applied to the brake;

detecting a peak value $T_M$ in the determined torque T, $T_m$ comprising a measure of the maximum possible torque value tending to accelerate the wheel;

storing a brake pressure value $P^*$ having a value defined by the expression $P^*=T_M/C_o$, $P^*$ being a measure of the optimum brake pressure value establishing the maximum possible torque value; and controlling the pressure to the brake to the value $P^*$, whereby the wheel brake pressure is established following an incipient wheel lockup condition to a value producing substantially the maximum possible braking torque.

* * * * *